United States Patent [19]

Belew

[11] Patent Number: 4,536,114

[45] Date of Patent: Aug. 20, 1985

[54] VARIABLE LENGTH STRUT WITH LONGITUDINAL COMPLIANCE AND LOCKING CAPABILITY

[75] Inventor: Robert R. Belew, Huntsville, Ala.

[73] Assignee: The United States of America as represented by the Administrator of the National Aeronautics and Space Administration, Washington, D.C.

[21] Appl. No.: 510,137

[22] Filed: Jul. 1, 1983

[51] Int. Cl.³ .............................................. F16M 13/00
[52] U.S. Cl. .................... 410/156; 244/118.1; 244/158 R; 248/550; 267/8 R; 267/150
[58] Field of Search ............................. 410/2, 52, 156; 403/104; 188/67, 134; 267/8 R, 150; 248/550, 562, 565, 613, 636; 244/118.1, 158 R, 161

[56] References Cited

U.S. PATENT DOCUMENTS

| 847,164 | 3/1907 | Corn | 188/67 X |
|---|---|---|---|
| 2,421,822 | 6/1947 | Wood | 248/562 X |
| 4,185,720 | 1/1980 | Wright, Jr. et al. | 188/134 |
| 4,407,395 | 10/1983 | Suozzo | 188/134 |
| 4,483,425 | 11/1984 | Newman | 248/550 X |

Primary Examiner—Randolph A. Reese

Attorney, Agent, or Firm—Joseph H. Beumer; John R. Manning; Leon D. Wofford, Jr.

[57] ABSTRACT

A variable length strut device (A) is illustrated for connecting two associated structures which includes an outer load bearing shell (B), a drive assembly (C), a length varying compliance assembly (D) positioned by drive assembly (C), and a strut rod locking assembly (E). Load bearing shell (B) includes a connecting part (32) adapted for connection to a first associated structure. A strut connection rod (58) has a connecting part (88) adapted for connection to a second associated structure and a distal end having a piston driver (74) slidably carried in a housing 44 of compliance assembly (D). Two compliance pistons (62, 64) act in opposing directions on the piston driver to provide longitudinal compliance in a compliance mode of operation. Locking assembly (E) includes locking balls (90) which are urged in a locking ring (92) as locking bolt (82) is urged to the left by fluid pressure. Microswitches (41) sense the displacement of pistons (62, 64) away from the internal ring (60) to bring the pistons to a neutral position wherein the pistons are in contact with the internal ring (60) when it is desired to do so as effected by a control source (112).

12 Claims, 5 Drawing Figures

VARIABLE LENGTH STRUT WITH LONGITUDINAL COMPLIANCE AND LOCKING CAPABILITY

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates to a strut connector device which has longitudinal compliance for varying the length of the strut and which may be locked in a desired longitudinal position when compliance is not desired. The variable length strut device has application to the construction of truss and beam structures in space and to the securing of payloads to orbiter vehicles. For example, in the connection of a payload and an orbit transfer vehicle (OTV) in the bay of an orbiter vehicle, such as a space shuttle, the variable length strut device is particularly advantageous. The device may have a compliant variable geometry capability in arranging and connecting the members together in the bay to provide a compliant geometrical strut structure which accommodates relative motion and displacement between interconnected payload elements during launch and orbit insertion. The device may also be locked in a longitudinal position for rigidity as needed.

Heretofore, conventional struts and connector methods have been utilized in the assembly of truss structures in space such as the use of conventional trusses and beams connected together by means of flanges and bolts. However, these connecions require significant amounts of manual work to assemble and disassemble.

Variable length strut devices are known such as in U.S. Pat. No. 3,300,233. Various other types of telescoping adjustable shafts and struts are known which utilize various locking means such as spring loaded locking balls and complementary detents.

Another prior strut coupling device is shown in U.S. Pat. No. 2,327,951 wherein adjustment may be had by a threaded coupling.

However, none of the above provide a variable length strut device having longitudinal compliance while maintaining connection between two members or alternate locking capability for providing a rigid strut which is suitable for space applications.

SUMMARY OF THE INVENTION

Accordingly, an important object of the present invention is to provide a variable length strut which has longitudinal compliance and longitudinal locking capability.

The above objective is accomplished according to the present invention by providing an outer load carrying shell, an electro/mechanical drive unit carried within the shell, a longitudinal compliance assembly carried within the shell connected to the electro/mechanical drive unit, and a locking device carried by the outer shell.

The compliance assembly includes a cylindrical member which slides in the interior of the outer cylindrical shell. One end of the shell is fixed and adapted to be connected to one associated structure and the opposite end of the outer cylindrical shell carries a longitudinally movable strut rod having one end connected to the compliance assembly and a free end adapted for connection to another associated structure. The locking device is carried by the free end of the strut rod for locking the shaft in relation to the outer cylindrical shell when rigidity is required. The compliance assembly includes a double acting piston operated upon by movements of the longitudinal compliance shaft for allowing the strut to yield when operating in an unlocked mode.

The multiplicity of these struts can be arranged to form a connection between two associated space vehicles such as a space tug and a payload or a more sophisticated truss structure in space. The interconnecting structure has a variable geometry capability and compliance. The structure may also be rigidized by locking the strut as need be to meet the particular mission requirements.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
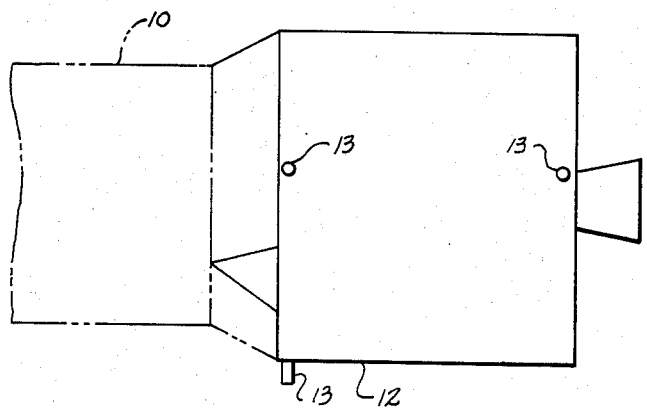
FIG. 1 is a side elevation illustrating interconnecting truss structures for connecting an orbit transfer vehicle and a payload by utilizing variable length strut devices constructed according to the present invention.
Figure 2:
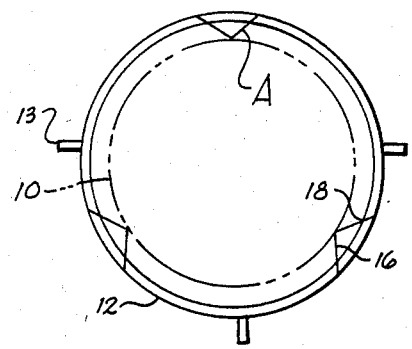
FIG. 2 is a front elevation of the orbit transfer vehicle and payload of FIG. 1.

FIG. 1 illustrates application of the invention to the interconnection of a payload 10 and an orbiter transfer vehicle (OTV) 12. The OTV is then mounted in the bay of an orbiter vehicle (not shown), such as a space shuttle vehicle, in a tripod configuration by means of conventional trunion mounts 13. The payload 10 and OTV 12 are connected together by a minimum of three pairs of variable length struts A constructed in accordance with the present invention.

Each pair of struts includes a first strut 16 having an end connected to the OTV 12 and a second strut 18 having one end connected to the OTV. The remaining ends of the struts 16 and 18 are then joined in apex fashion to the payload 10 as illustrated.

Referring now in more detail to the drawings, the variable length strut device A possessing both longitudinal compliance and longitudinal locking capability is illustrated in the form of an elongated outer load carrying cylindrical shell housing B which includes a straight barrel section 20 having an interior bore 22. The barrel section 20 is flanged at both ends at 24 and 26. Each flange has a plurality of openings therein which receive bolts 28 for fastening the respective flanged ends to connecting parts.

There is one connecting end fitting 30 bolted on to the flange 24 which may include a connecting part 32 for interconnecting with a truss structure, a payload, or vehicle. A second connecting end fitting 34 is bolted on to flange 26.

There is provided a means for driving the strut device to vary its length in the form of an electro/mechanical drive unit C carried within the cylindrical housing. The electro/mechanical drive unit C is attached to the end fitting by means of screws 36. There is a motorized screw 38 which is driven by the motor 40 of the electro/mechanical drive unit. The motor 40 may be driven from remote control location in a conventional manner, and may be driven in response to the actuation of microswitches 41 or other appropriate sensing devices as will be more fully explained hereinafter. The motorized screw is threaded into an end plate of a longitudinal compliance assembly D which provides means for yielding to axial loads when the device is used in a longitudinal compliance mode.

Longitudinal compliance assembly D includes a flanged cylinder 44 having flanges 46 and 48 which carry sealing rings 50 and 52, respectively. Rings 50 and 52 slide against the inside of the cylindrical barrel 20. Left end plate 42 is connected to the flange 46 of cylinder 44 by means of screws 54. A second end plate 56 is connected to the flange 48 of cylinder 44 by means of like screws 54. End plate 56 is open for receiving a strut connecting rod 58.

The cylinder 44 has an internal abutment ring 60 which limits the travel of a left end piston 62 and the travel of a right end piston 64. Left end piston 62 is spring loaded by a compression spring 66 and is fitted with piston rings 68. The right end piston is spring loaded with a spring 70 and is fitted with piston rings 72. Both springs 66 and 70 are spring loaded with the same force and can be further compressed by the pistons 62 and 64 which are driven by a piston driver 74 which is fitted to the strut rod 58 by means of a threaded connection 76 by which the rod 58 can be tightly threaded upon the neck of the piston driver. The piston driver 74 is chamfered at 74a on each end to accommodate like chamfers 62a and 64a of the pistons. The chamfer on the piston driver and pistons provides a means for assuring axial alignment of the piston strut rod 58 and stabilizes the unit in the lateral direction to eliminate chatter.

Biasing means resiliently opposing movement of piston driver 74 and strut connecting rod 58 in the compliance mode of operation is provided by pistons 62 and 64 which are resiliently urged against the piston driver by springs 66 and 70 in the two opposing directions.

End fitting 34 is open for slidably receiving the strut connecting rod 58.

A means for locking the strut connecting rod 58 to provide a rigid strut device is provided by a locking assembly E. Locking assembly E includes a locking housing 80 which is an integral extension of the rod 58. A locking bolt 82 is carried within the housing and is biased in the position shown by means of a bolt preload spring 84 urging the locking bolt rearwardly as illustrated. An end fitting 86 is carried on the free end of the housing which includes a second connecting part 88 for connecting the strut to an associated structure.

Locking means is provided by four locking balls 90 carried by housing 80 and a complementary locking means is provided by a locking ball groove 92 carried in end fitting 34. There are two screw fittings 94 and 96 which provide ports for connecting the bore 98 of the housing to a pyrotechnic or gas drive source for driving the locking bolt which provides a means for engaging or disengaging the locking balls in the complementary locking groove. Gaskets are provided at 100, 101, and 102 for sealing the housing as required.

Figure 5:
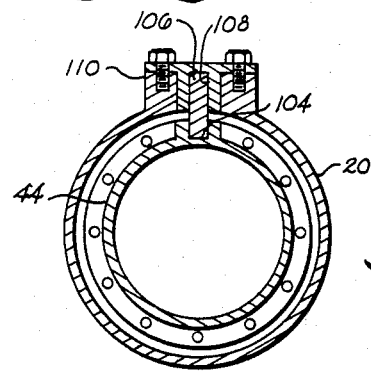
FIG. 5 is a sectional view taken along line 5—5 of FIG. 4.

As can best be seen in FIG. 5, the cylinder 44 of the longitudinal compliance assembly is constrained from rotating in the barrel 20 of the outer load bearing cylinder by a grooved track 104, which accommodates a follower pin 106 likewise accommodated in a hole 108 formed in a follower pin support 110 of the outer cylinder. The track 104 is an integrally machined part of the cylinder 44 and the follower pin is pivotably mounted to the follower pin support bracket 110.

Figure 4:
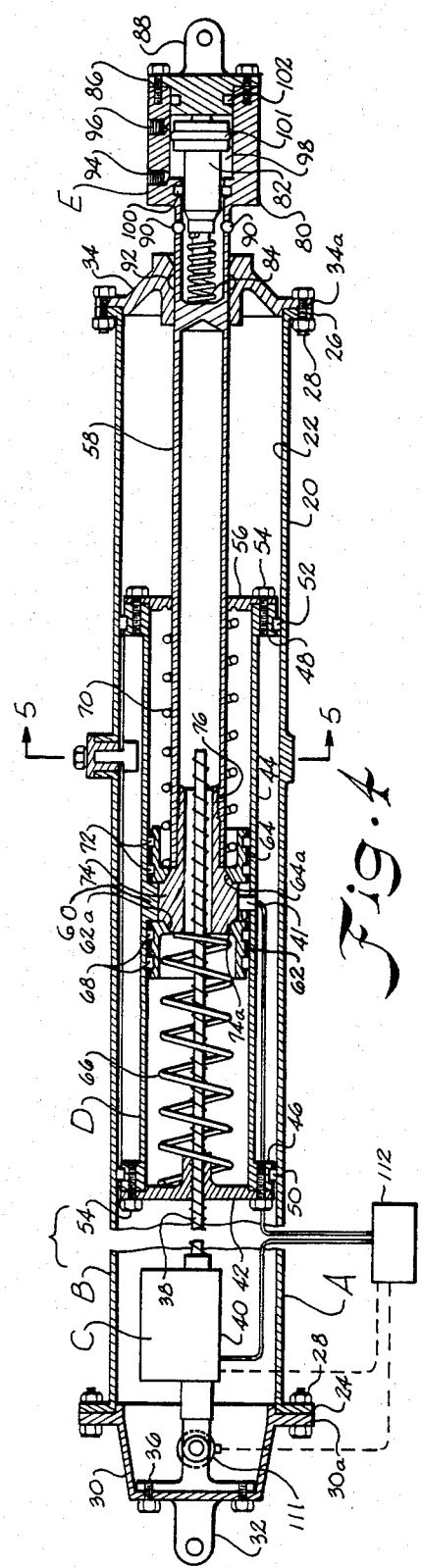
FIG. 4 is a sectional view taken along a longitudinal section of FIG. 3.
Figure 3:
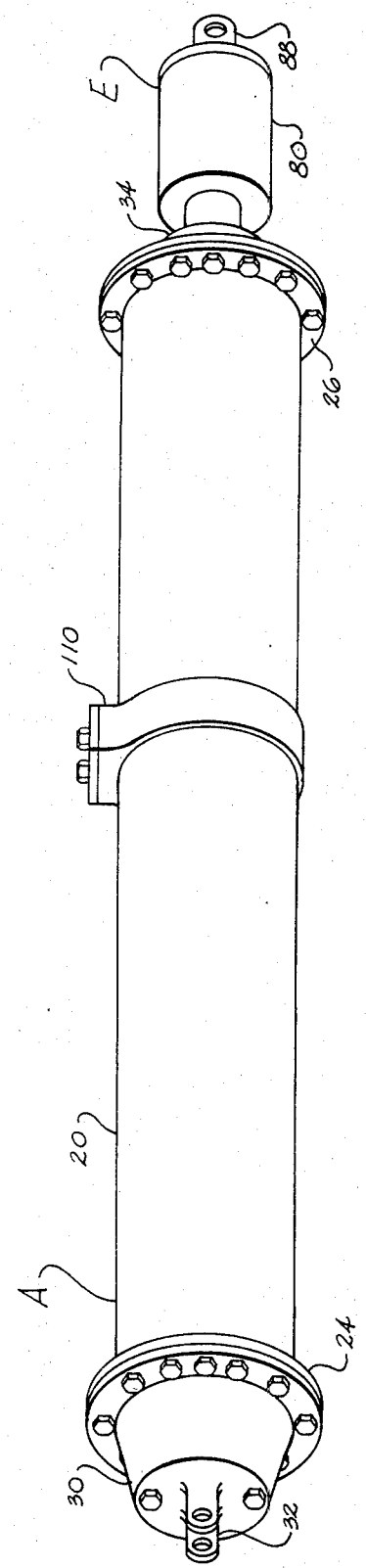
FIG. 3 is a perspective view of the variable strut device constructed according to the present invention.

The sectional view of FIG. 4 illustrates the variable length strut device and the relative positioning of the various parts in a no-load condition of the strut. The no-load condition occurs when no external forces are applied to the strut and no axial load exists in the strut connecting rod 58. This can occur when two strut-interconnected payloads are at rest. The no-load condition is achieved by adjusting the longitudinal compliance assembly D so that the piston driver 74 is centered as shown with pistons 62 and 64 fully seated thereon.

Microswitches 41 can be incorporated in the inner ring 60 of the cylinder 44 to sense the bottom of pistons 62 and 64 against the piston driver. Alternate means for sensing a load on the pistons and movement thereof away from the piston driver may be provided by a load sensing clevis pin 111 utilized as the pin connection for drive unit C. Any suitable load sensing clevis pin may be utilized such as shown in U.S. Pat. No. 3,695,096, incorporated herein. A pin is available from the Strainsert Company of Anaheim, Calif. The longitudinal position of the compliance assembly D can be determined by the use of a potentiometer or rotation counters on the electro/mechanical drive unit C operating in conjunction with a computer.

When in automatic operation, microswitches 41 can be placed into circuit through remote or computer control at 112. In this case, switches 41, which are normally closed, operate the control motor 40 when either piston 62 or 64 is off of chamfered edge 74a to move the compliance housing so that the displaced piston is brought back to the neutral or no-load position for reasons which will be explained more fully hereinafter. Alternately, the output of load sensing clevis pin 111 may be input to computer 112 and motor 40 controlled thereby to bring the compliance assembly to a no-load position.

In use, the payload 10 and OTV 12 are connected together by strut pairs 16, 18 while on the ground and installed in the shuttle vehicle bay with mounts 13 seated in trunion supports (not shown). Then in the launch configuration, motorized acme screw 38 of each strut A is turned to bring the compliance assembly into the no-load, neutral position so that the two pistons are seated. During launch, there is a lot of bending and twisting of the shuttle orbiter vehicle as it is flexible. During this motion, piston driver 74 is driven relative to the compliance unit D, back and forth, and compresses the springs 66 and 70 alternately. Chamfers 62a, 64a keep the piston driver 74 radially (or laterally) centered. Without the chamfers, lateral vibrations may possibly persist and the chamfers provide stability in the lateral direction. There is enough movement in the compliance assembly to accommodate the relative movement between the payload and OTV due to bending and twisting of the shuttle orbiter.

The relative motion between the strut end attachments 32 and 88 drives the strut connecting rod 58 back and forth. Pistons 62 and 64 are more or less alternately displaced from their seated positions but remain in intimate contact with the piston driver 74 or the internal ring 60 or both due to the force exerted by the compliance springs 66 and 70. The compliance springs have a low spring rate and are installed with a preload force; therefore, loads imposed on the electro/mechanical driving unit C through the screw 38 are low.

Once in orbit, the bay of the shuttle orbiter is opened. Once the payload bays are open, the payload and OTV are subject to a different set of stress and thermal conditions. This will possibly result in loading of the piston driver against one or more of the springs in each one of the struts. Microswitches 41 or other sensing devices are then put into operation through control 112 and sense which way the piston driver is loaded. The microswitches (or other sensors) provide the signal to operate the drive motor in each strut to position the compliance unit longitudinally and eliminate the preload on the strut so that the piston driver returns to the neutral position. The OTV and payload may then be removed.

Without the ability to adjust the compliance assembly to the neutral position, the struts might be preloaded, and unloading of the struts is needed so that the payload and OTV can be removed from the payload bay of the shuttle. If the struts are loaded and the geometry of the payload 10 and OTV 12 changed, difficulty in removing same from the Airborne Support Equipment (ASE) and trunions can be encountered. The manipulators (RMS) (remote manipulating system), for removing the payload and OTV can handle very low loads.

Once out of the bay and in orbit, the struts are locked before ignition of the booster engine of the OTV. The thrust on these engines is relatively large and locking of the struts is necessary.

Thus, the payload and OTV so interconnected by the variable length strut device can move relative to one another while in the bay without imparting significant loads to one another through the struts. Loads that occur in the struts in orbit or to changes in the orbiter or payload structure geometry can be detected by the microswitches and zeroed out by proper positioning of the compliance assembly. This makes it possible to unload the trunions to aid in lifting the interconnected payload and vehicle out of the orbiter payload bay.

Once the interconnected payloads are placed in orbit, the interconnecting struts A can be fully rigidized by positioning and actuating the locking balls 90 for thrusting of the OTV.

The electro/mechanical drive unit C fully retracts the strut so that the ball locking housing 80 interfaces with the end fitting 34 and the four locking balls 90 are in registration with the locking groove 92. The locking bolt 82 is then driven by high pressure gases supplied through the ports 96. By this means the locking balls 90 are forced in the groove 92 and the connecting strut rod 58 is locked in place to provide a rigid connection and structure. To unlock the bolt, high pressure gas is introduced through port 94.

Thus, it can be seen that a highly advantageous form of the invention is provided in which two associated structures may be interconnected in relative motion between the two members absorbed by the interconnecting strut until such time as it is desired to rigidize the connection and geometry of the two structures with respect to each other. The configuration and length of the strut may be adjusted in time on command by suitable control, either remotely or otherwise in a conventional manner of the electro/mechanical drive unit.

Although the primary purpose of the invention is to provide a means for structurally interconnecting two associated orbiter payloads such as an OTV stage and its payload during launch, orbit insertion, and orbital operations, other important advantages are apparent. The features incorporated in the invention can also be utilized to provide for in orbit retrieval and return to earth of interconnected payloads. The application of six variable length struts with longitudinal compliance and locking capability may also be used in combination with other compatible interconnecting structures such as struts devoid of the electromechanical drive unit and the standard compliance assembly. The additional struts or other load carrying interconnecting structure would be tailored to suit the specific requirements of a particular application.

While a preferred embodiment of the invention has been described using specific terms, such description is for illustrative purposes only, and it is to be understood that changes and variations may be made without departing from the spirit or scope of the following claims.

What is claimed is:

1. A variable length strut device with longitudinal compliance and longitudinal locking capability comprising:

an outer load bearing shell having a barrel;
an end fitting carried on one end of said barrel including a first connecting part for connecting to an associated structure;
a second end fitting carried on a second end of said barrel;
a slidable compliance assembly received in the interior of said barrel;
means for restraining relative rotational movement between said compliance assembly and said barrel;
drive means for driving and positioning said compliance assembly slidably in said barrel;
a strut connecting rod carried by said compliance assembly extending through said second end fitting in a slidable manner;
a second connecting part carried by said strut connecting rod adapted for connection to a second associated structure;
compliance means connecting said strut connecting rod to said compliance assembly enabling said connecting rod to move relative to said compliance assembly housing to accommodate axial thrusts from said strut device in opposing directions; and
means for locking said strut preventing sliding and compliance of said strut in a longitudinal direction.

2. The device of claim 1 wherein said compliance assembly includes a compliance housing having an interior bore, said compliance means including an abutment ring extending into said bore, a first slidable piston slidably carried in said bore on a first side of said ring, a second slidable piston slidably carried in said bore on a second side of said ring, and a piston driver connected to said strut rod for driving said first and second pistons in opposing directions, and biasing means urging each of said pistons against said piston driver.

3. The device of claim 2 including sensor means for sensing the position of said first and second pistons away from said driver piston and actuating said drive means to bring said compliance assembly to a neutral position wherein said driver piston and first and second pistons are seated against one another.

4. The device of claim 1 wherein said locking means includes a locking assembly integrally carried by said free end of said connecting strut rod including a housing, locking elements carried by said housing, a complementary locking assembly carried by said second end fitting, and engagement means for engaging said locking elements carried by said housing into engagement with said complementary locking assembly carried in said end fitting.

5. The device of claim 4 wherein said engagement means includes a reciprocating locking bolt carried in said housing and actuation means for actuating said locking bolt to engage said locking elements and said complementary locking assembly.

6. A variable length strut device comprising:
an outer load bearing shell having a first end adapted for connection to a first associated structure;
a strut connection rod slidably carried by said shell having a free end adapted for connection to a second associated structure;
a compliance assembly including a housing slidably carried in said shell;
said strut rod having a second end remote from said free end slidably received within an interior of said compliance assembly housing;
biasing means acting on said second end of said strut rod resisting movement of said strut in either one of two opposing directions when operating in a compliance mode;
drive means positioning said compliance assembly housing longitudinally in said shell; and
locking means for locking said strut rod in a longitudinal position when operating in a locked mode wherein said strut rod is prevented from sliding longitudinally relative to said shell.

7. The apparatus of claim 6 including:
a piston driver connected to said second end of said strut rod;
said biasing means including a first piston slidably carried in said compliance assembly housing resiliently urged against said piston driver in a first of said opposing directions; and
a second piston slidably carried in said compliance assembly housing resiliently urged against said piston driver in a second of said opposing directions.

8. The apparatus of claim 7 including:
an abutment ring carried within said compliance assembly housing;
said first and second pistons being limited in their longitudinal movement by said abutment ring in said opposing direction; and
said piston driver being freely movable past said ring in both said opposing directions.

9. The apparatus of claim 8 including:
sensor means sensing the position of said first and second pistons and moving said compliance assembly housing to bring said compliance assembly to a neutral position wherein said piston driver, first piston, and second piston are in contact with one another.

10. The apparatus of claim 6 wherein said locking means includes:
a locking assembly carried by said free end of said strut rod;
a complementary locking assemby carried by said shell; and
engagement means for engaging said locking assembly and complementary locking assembly to prevent longitudinal movement of said strut rod.

11. A variable length strut device comprising:
an outer load bearing shell having a first end adapted for connection to a first associated structure;
a strut connection rod slidably carried by said shell having a free end adapted for connection to a second associated structure to vary the overall effective length of said strut device;
a compliance assembly including a housing slidably carried in said shell;
said strut rod having a second end remote from said free end slidably received within an interior of said compliance assembly housing;
a piston driver connected to said second end of said strut rod;
a first compliance piston slidably carried in said compliance assembly housing resiliently urged against said piston driver in a first of said opposing directions;
a second compliance piston slidably carried in said compliance assembly housing resiliently urged against said piston driver in a second of said opposing directions;
an abutment ring carried within said compliance assembly housing;
said first and second pistons being limited in their longitudinal movement by said abutment ring in said opposing direction;
said piston driver being freely movable past said ring in both said opposing directions;
drive means positioning said compliance assembly housing longitudinally in said shell; and
locking means for locking said strut rod in a longitudinal position when operating in a locked mode wherein said strut rod is prevented from sliding longitudinally relative to said shell.

12. The apparatus of claim 11 wherein said locking means includes:
a locking assembly carried by said free end of said strut rod;
a complementary locking assembly carried by said shell; and
engagement means for engaging said locking assembly and complementary locking assembly to prevent longitudinal movement of said strut rod.

* * * * *